United States Patent
Jo et al.

(10) Patent No.: US 11,513,387 B2
(45) Date of Patent: Nov. 29, 2022

(54) POLARIZING PLATE FOR IN-PLANE SWITCHING MODE AND OPTICAL DISPLAY APPARATUS COMPRISING THE SAME

(71) Applicant: Samsung SDI Co., Ltd., Yongin-si (KR)

(72) Inventors: A Ra Jo, Suwon-si (KR); Beom Deok Lee, Suwon-si (KR); Seung Mi Shin, Suwon-si (KR); Seong Hoon Lee, Suwon-si (KR); Wan Taek Hong, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/349,577

(22) Filed: Jun. 16, 2021

(65) Prior Publication Data

US 2021/0397043 A1 Dec. 23, 2021

(30) Foreign Application Priority Data

Jun. 18, 2020 (KR) ........................ 10-2020-0074566

(51) Int. Cl.
*G02F 1/1335* (2006.01)
*G02B 5/30* (2006.01)
*G02F 1/13363* (2006.01)

(52) U.S. Cl.
CPC ....... *G02F 1/133528* (2013.01); *G02B 5/305* (2013.01); *G02B 5/3083* (2013.01); *G02F 1/133637* (2021.01)

(58) Field of Classification Search
CPC ......... G02F 1/133528; G02F 1/133637; G02B 5/3083; G02B 5/3041
See application file for complete search history.

(56) References Cited

U.S. PATENT DOCUMENTS

2006/0103796 A1* 5/2006 Kawamoto .......... G02B 5/3041
349/119

FOREIGN PATENT DOCUMENTS

| JP | 2006-251659 A | 9/2006 |
| TW | 200919035 A | 5/2009 |
| TW | 201940324 A | 10/2019 |

OTHER PUBLICATIONS

Office Action from corresponding Taiwan Patent Application No. 110122047, Taiwan Office Action dated Mar. 28, 2022 (7 pgs.).

* cited by examiner

*Primary Examiner* — Jessica M Merlin
(74) *Attorney, Agent, or Firm* — Lewis Roca Rothgerber Christie LLP

(57) ABSTRACT

A polarizing plate for IPS mode and an optical display apparatus including the same are provided. A polarizing plate includes: a polarizer; a first protective layer on an upper surface of the polarizer; and a second protective layer on a lower surface of the polarizer, wherein, assuming an axis of the polarizer having a high index of refraction in an in-plane direction of the polarizer is a reference axis (0°), an angle of an axis of the first protective layer having a low index of refraction in the in-plane direction thereof is in a range of about −5° to +5°, the first protective layer has an in-plane retardation Re of about 5,000 nm or more at a wavelength of 550 nm, the second protective layer includes a positive C plate layer, and the second protective layer satisfies at least one of Relations 1 and 2.

20 Claims, 1 Drawing Sheet

POLARIZING PLATE FOR IN-PLANE SWITCHING MODE AND OPTICAL DISPLAY APPARATUS COMPRISING THE SAME

CROSS-REFERENCE TO RELATED APPLICATION

This application claims priority to and the benefit of Korean Patent Application No. 10-2020-0074566, filed on Jun. 18, 2020 in the Korean Intellectual Property Office, the entire disclosure of which is incorporated herein by reference.

BACKGROUND

1. Field

Aspects of embodiments of the present invention relate to a polarizing plate for in-plane switching (IPS) mode and an optical display apparatus including the same.

2. Description of the Related Art

As one of liquid crystal displays, there is an in-plane switching (IPS) mode liquid crystal display. In the IPS mode liquid crystal display, nematic liquid crystals homogeneously aligned with no electric field applied thereto are driven by application of a lateral electric field to display an image. The IPS mode liquid crystal display has an advantage of a broader viewing angle than liquid crystal displays with other driving modes.

The IPS mode liquid crystal display has a problem of significant color variation (also referred to as lateral color shift) of an image according to viewing angle. Various challenges have been made to overcome color variation of an image through compensation for viewing angle and several sheets of optical compensation films. However, these techniques do not provide sufficient improvement in color variation. In recent years, color variation of an image has become more apparent with reduction in thickness and increase in size of liquid crystal displays. Accordingly, there is a need for IPS mode liquid crystal displays having a reduced thickness and a large area while securing good effects.

The background technique of the present invention is disclosed in Japanese Unexamined Patent Publication No. 2006-251659 and the like.

SUMMARY

According to an aspect of embodiments of the present invention, a polarizing plate for IPS mode, which has improved front contrast ratio (CR), is provided.

According to another aspect of embodiments of the present invention, a polarizing plate for IPS mode, which has improved lateral color shift, is provided.

According to another aspect of embodiments of the present invention, a polarizing plate for IPS mode, which suppresses light leakage to improve black visibility, is provided.

According to one or more embodiments of the present invention, a polarizing plate for IPS mode includes: a polarizer; a first protective layer on an upper surface of the polarizer; and a second protective layer on a lower surface of the polarizer, wherein, assuming an axis of the polarizer having a high index of refraction in an in-plane direction of the polarizer is a reference axis (0°), an angle of an axis of the first protective layer having a low index of refraction in an in-plane direction of the first protective layer is in a range of about −5° to +5°, the first protective layer has an in-plane retardation Re of about 5,000 nm or more at a wavelength of 550 nm, the second protective layer includes a positive C plate layer, and the second protective layer satisfies at least one of the following Relations 1 and 2:

$$Re(450)/Re(550) > Re(650)/Re(550), \quad \text{Relation 1}$$

where $Re(450)$, $Re(550)$, and $Re(650)$ are in-plane retardations (unit: nm) of the second protective layer at wavelengths of about 450 nm, about 550 nm, and about 650 nm, respectively, and $$|Rth(450)|/|Rth(550)| > |Rth(650)|/|Rth(550)|, \quad \text{Relation 2}$$

where $|Rth(450)|$, $|Rth(550)|$, and $|Rth(650)|$ are absolute values of out-of-plane retardations (unit: nm) of the second protective layer at wavelengths of about 450 nm, about 550 nm, and about 650 nm, respectively.

In one or more embodiments, the second protective layer may satisfy both Relation 1 and Relation 2.

In one or more embodiments, in Relation 1, $Re(450)/Re(550)$ may be in a range of about 0.1 to about 10, and $Re(650)/Re(550)$ may be in a range of about 0.1 to about 8.

In one or more embodiments, in Relation 2, $|Rth(450)|/Rth(550)|$ may be in a range of about 0.1 to about 10, and $|Rth(650)|/|Rth(550)|$ may be in a range of about 0.1 to about 8.

In one or more embodiments, the second protective layer may have an out-of-plane retardation of about −150 nm to about −10 nm at a wavelength of 550 nm.

In one or more embodiments, the second protective layer may be a non-liquid crystal layer.

In one or more embodiments, the second protective layer may be a coating layer formed of a composition including at least one selected from among a cellulose ester compound or a polymer thereof and an aromatic compound or a polymer thereof.

In one or more embodiments, the axis of the first protective layer having the low index of refraction in the in-plane direction thereof may be a machine direction (MD) of the first protective layer, and an axis of the first protective layer having a high index of refraction in the in-plane direction thereof may be a transverse direction (TD) of the first protective layer.

In one or more embodiments, the axis of the polarizer having the high index of refraction in the in-plane direction thereof may be a machine direction of the polarizer, and an axis of the polarizer having a low index of refraction in the in-plane direction thereof may be a transverse direction of the polarizer.

In one or more embodiments, the second protective layer may be directly formed on the polarizer.

In one or more embodiments, the polarizing plate may further include a third protective layer.

In one or more embodiments, the third protective layer may have an in-plane retardation Re of about 100 nm or less at a wavelength of 550 nm.

In one or more embodiments, the third protective layer may have an out-of-plane retardation of about −10 nm to about 200 nm at a wavelength of 550 nm.

In one or more embodiments, the third protective layer may have a degree of biaxiality of about −1 to about 10 at a wavelength of 550 nm.

In one or more embodiments, a laminate of the third protective layer and the second protective layer may satisfy at least one of the following Relations 3 and 4:

$$Re(450)/Re(550) > Re(650)/Re(550), \quad \text{Relation 3}$$

where Re(450), Re(550), and Re(650) are the same as those described below, and $$|Rth(450)|/|Rth(550)| > |Rth(650)|/|Rth(550)|, \quad \text{Relation 3}$$

where |Rth(450)|, |Rth(550)|, and |Rth(650)| are the same as those described below.

In one or more embodiments, in Relation 3, Re(450)/Re(550) may be in a range of about 0.1 to about 10, and Re(650)/Re(550) may be in a range of about 0.1 to about 8.

In one or more embodiments, in Relation 4, |Rth(450)|/|Rth(550)| may be in a range of about 0.1 about to 10, and |Rth(650)|/|Rth(550)| may be in a range of about 0.1 to about 8.

In one or more embodiments, a laminate of the third protective layer and the second protective layer may have an out-of-plane retardation of about −150 nm to about −10 nm at a wavelength of 550 nm.

In one or more embodiments, the polarizing plate may have an in-plane retardation of about −10 nm to about 10 nm at a wavelength of 550 nm.

According to another aspect of embodiments of the present invention, an optical display apparatus is provided.

The optical display apparatus includes a polarizing plate for IPS mode, according to an embodiment of the present invention.

According to one or more embodiments of the present invention, a polarizing plate for IPS mode, which has improved front contrast ratio (CR), is provided.

According to one or more embodiments of the present invention, a polarizing plate for IPS mode, which has improved lateral color shift, is provided.

According to one or more embodiments of the present invention, a polarizing plate for IPS mode, which suppresses light leakage to improve black visibility, is provided.

DETAILED DESCRIPTION

Figure 1:
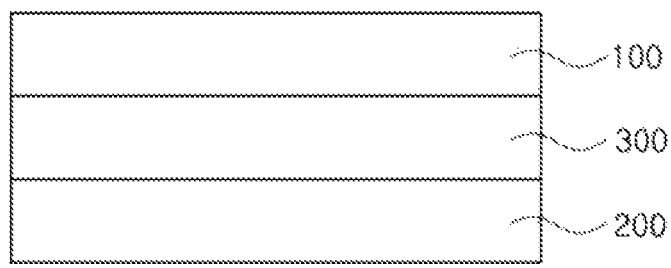
FIG. 1 is a cross-sectional view of a polarizing plate for IPS mode, according to an embodiment of the present invention.

Herein, some embodiments of the present invention will be described in further detail with reference to the accompanying drawings. The following embodiments will be described in further detail with reference to the accompanying drawings to provide a thorough understanding of the invention to those skilled in the art. In the drawings, components unrelated to description may be omitted for clear description of the invention, and like components will be denoted by like reference numerals throughout the specification. Although lengths, thicknesses, or widths of various components may be exaggerated in the drawings for reasons of clarity and understanding, the present invention is not limited thereto.

Herein, spatially relative terms, such as "upper" and "lower," are defined with reference to the accompanying drawings. Thus, it will be understood that the term "upper surface" can be used interchangeably with the term "lower surface," for example. Further, when an element, such as a layer or a film, is referred to as being "on" or "placed on" another element, it may be directly on or placed on the other element, or one or more intervening elements may be present. On the other hand, when an element is referred to as being "directly on," "placed directly on," "immediately on," "formed directly on," or "formed to directly contact" another element, there are no intervening element(s) therebetween.

Herein, "in-plane retardation Re," "out-of-plane retardation Rth," and "degree of biaxiality NZ" are represented by Equations A, B, and C, respectively:

$$Re = (nx - ny) \times d, \quad (A),$$

$$Rth = ((nx + ny)/2 - nz) \times d, \quad (B),$$

$$NZ = (nx - nz)/(nx - ny), \quad (C),$$

where nx, ny, and nz are indexes of refraction of a corresponding optical device in the slow axis direction, the fast axis direction, and the thickness direction of the optical device at a measurement wavelength, respectively, and d is the thickness thereof (unit: nm). In Equations A to C, the measurement wavelength may be 450 nm, 550 nm, or 650 nm.

Here, the x-axis direction is defined as the slow axis direction of an optical device, and the y-axis direction is defined as the fast axis direction thereof. The optical device may be a polarizing plate, a first protective layer, a second protective layer, or a third protective layer.

Here, "(meth)acryl" refers to acryl and/or methacryl.

Herein, a lateral side refers to a region from (60°, 45°) to (60°, 135°) or a region from (45°, 45°) to (45°, 135°) in the spherical coordinate system represented by (φ, θ), in which a front side is indicated by (0°, 0°), a left end point is indicated by (180°, 90°), and a right end point is indicated by (0°, 90°) with reference to the horizontal direction.

As used herein to represent a specific numerical range, the expression "X to Y" means "greater than or equal to X and less than or equal to Y."

A polarizing plate for IPS mode, according to embodiments of the present invention, improves front contrast ratio by improving brightness in a white mode while reducing brightness in a black mode. The front contrast ratio may be calculated by a ratio of brightness in the white mode to brightness in the black mode (brightness in white mode/brightness in black mode). In addition, a polarizing plate according to embodiments of the present invention improves lateral color shift and black visibility by realizing true black through suppression of light leakage.

Next, a polarizing plate for IPS mode, according to an embodiment of the present invention, will be described with reference to FIG. 1 and FIG. 2.

Referring to FIG. 1, a polarizing plate according to an embodiment of the present invention includes a polarizer 300, a first protective layer 100, and a second protective layer 200.

In the polarizing plate, the first protective layer 100 is formed on an upper surface (light exit surface) of the polarizer 300. The second protective layer 200 is formed on a lower surface (light incidence surface) of the polarizer 300.

The polarizing plate satisfies two conditions at the same time, as described below in further detail. That is, according to the present invention, in-plane retardation of the first protective layer at a wavelength of 550 nm, and an angle between an axis of the first protective layer having a low index of refraction and an axis of the polarizer having a high index of refraction are controlled on the light exit surface of the polarizer while controlling wavelength dispersion of the second protective layer on the light incidence surface of the polarizer. As a result, the polarizing plate can achieve improvement in front contrast ratio, lateral color shift, and black visibility. If any one of these conditions is not satisfied, these advantageous effects of the present invention cannot be achieved.

According to an embodiment of the present invention, the polarizing plate may have an in-plane retardation of about −10 nm to about 10 nm, for example, about −10 nm, about −9 nm, about −8 nm, about −7 nm, about −6 nm, about −5 nm, about −4 nm, about −3 nm, about −2 nm, about −1 nm, about 0 nm, about 1 nm, about 2 nm, about 3 nm, about 4 nm, about 5 nm, about 6 nm, about 7 nm, about 8 nm, about 9 nm, or about 10 nm, and, in an embodiment, about 0 nm to about 10 nm, for example, about 0 nm to about 5 nm, at a wavelength of 550 nm. Within this range, the polarizing plate can realize all of the aforementioned effects while maintaining front color sensitivity.

Figure 2:
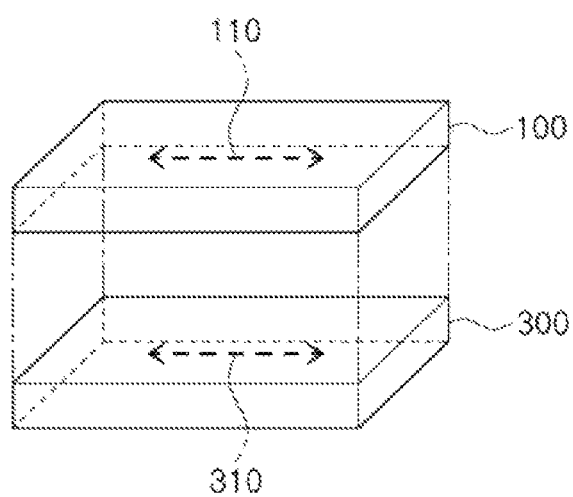
FIG. 2 is a conceptual view depicting a relationship between an axis having a low index of refraction and an axis having a high index of refraction in an in-plane direction of a polarizer in the polarizing plate for IPS mode shown in FIG. 1.

As a first condition, referring to FIG. 2, assuming an axis 310 of the polarizer 300 having a high index of refraction in the in-plane direction of the polarizer 300 is a reference axis (0°), an angle of an axis 110 of the first protective layer 100 having a low index of refraction in the in-plane direction of the first protective layer 100 is in a range of about −5° to +5°. Within this range, the polarizing plate can achieve improvement in front contrast ratio, lateral color shift, and black visibility.

As used herein to represent an angle, "+" means a clockwise direction about a reference point and "−" means a counterclockwise direction about the reference point with reference to 0°.

In an embodiment, in FIG. 2, the angle may be in a range of about −4° to about +4°, in a range of about −3° to about +3°, in a range of about −2° to about +2°, or in a range of about −1° to about +1°, and, in an embodiment, 0°. Within this range, the polarizing plate can achieve the aforementioned effects and can be manufactured through a roll-to-roll process to improve processability and economic feasibility.

As a second condition, the second protective layer 200 includes a positive C plate layer. The positive C plate layer means a layer satisfying nz>nx≈ny (nx, ny, and nz are indexes of refraction of the positive C plate layer in the slow axis direction, the fast axis direction, and the thickness direction of the positive C plate layer, respectively, at a wavelength of 550 nm).

In addition, the second protective layer 200 satisfies at least one of the following Relations 1 and 2:

$$Re(450)/Re(550)>Re(650)/Re(550), \quad \text{Relation 1}$$

where Re(450), Re(550), and Re(650) are in-plane retardations (unit: nm) of the second protective layer at wavelengths of about 450 nm, about 550 nm, and about 650 nm, respectively, and $$|Rth(450)|/|Rth(550)|>|Rth(650)|/|Rth(550)|, \quad \text{Relation 2}$$

where |Rth(450)|, |Rth(550)|, and |Rth(650)| are absolute values of out-of-plane retardations (unit: nm) of the second protective layer at wavelengths of about 450 nm, about 550 nm, and about 650 nm, respectively.

Re(450)/Re(550) refers to a value obtained by dividing Re(450) by Re(550). Re(650)/Re(550), |Rth(450)|/|Rth(550)|, and |Rth(650)|/|Rth(550)| may be calculated by the same method.

The second protective layer 200 includes the positive C plate layer and satisfies at least one of Re and Rth, as in Relations 1 and 2, whereby the polarizing plate can achieve improvement in front contrast ratio, lateral color shift, and black visibility. In an embodiment, the second protective layer 200 may be a positive C plate layer alone.

Next, each component of the polarizing plate will be described in further detail.

Polarizer

In an embodiment, the polarizer 300 includes a light absorption type polarizer that splits incident light into two polarized light components orthogonal to each other to transmit one of the two polarized light components therethrough while absorbing the other light component.

In an embodiment, in an in-plane direction of the polarizer, an axis of the polarizer having a high index of refraction may be an absorption axis thereof, and an axis of the polarizer having a low index of refraction may be a transmission axis thereof.

In an embodiment, in the in-plane direction of the polarizer, the axis of the polarizer having a high index of refraction may be a machine direction (MD) of the polarizer, and the axis of the polarizer having a low index of refraction may be a transverse direction (TD) of the polarizer.

In an embodiment, the polarizer 300 may have a light transmittance of about 40% or more, and, in an embodiment, about 40% to about 45%. In an embodiment, the polarizer 300 may have a degree of polarization of about 95% or more, and, in an embodiment, about 95% to about 100%, and, in an embodiment, about 98% to about 100%. Within this range, the polarizing plate can further improve front contrast ratio and durability.

The polarizer 300 may include a dichroic dye-containing polarizer formed through uniaxial stretching.

In an embodiment, the dichroic dye-containing polarizer may include a polarizer formed by MD uniaxially stretching a base film for polarizers, followed by dyeing the base film with dichroic dyes (for example, iodine or potassium iodide as an iodine-containing material). The base film for polarizers may include a polyvinyl alcohol film or derivatives thereof, without being limited thereto. The polarizer may be manufactured by a typical method known to those skilled in the art.

In an embodiment, the polarizer 300 has a thickness of about 1 μm to about 40 μm, and, in an embodiment, about 5 μm to about 30 μm, and, in an embodiment, about 10 μm to about 25 μm. Within this range, the polarizer can be used in the polarizing plate.

First Protective Layer

The first protective layer 100 is disposed on an upper surface (light incidence surface) of the polarizer 300 to protect the polarizer 300. The first protective layer 100 can provide the effect of improving front contrast ratio, lateral color shift, and black visibility through adjustment in in-plane retardation and an angle between axes thereof.

The first protective layer 100 has an axis having a high index of refraction and an axis having a low index of refraction in an in-plane direction thereof. Here, the "axis having a high index of refraction" and the "axis having a low index of refraction" are defined through comparison between the x-axis and the y-axis corresponding to two axes of the first protective layer in the in-plane direction thereof. In the in-plane direction of the first protective layer, the axis having a high index of refraction and the axis having a low index of refraction may be formed by stretching among processes in manufacture of the first protective layer. For example, in the first protective layer, the axis having a high index of refraction may be a slow axis, and the axis having a low index of refraction may be a fast axis thereof.

In an embodiment, in the in-plane direction of the first protective layer 100, the axis of the first protective layer having a low index of refraction may be a machine direction (MD) thereof, and the axis of the first protective layer 100 having a high index of refraction may be a transverse direction (TD) thereof. In this case, the first protective layer 100 may be a TD-uniaxially stretched film or a TD-uniaxially stretched coating layer.

In another embodiment, in the in-plane direction of the first protective layer 100, the axis of the first protective layer 100 having a low index of refraction may be the transverse direction (TD) thereof, and the axis of the first protective layer 100 having a high index of refraction may be the machine direction (MD) thereof. In this case, the first protective layer 100 may be an MD-uniaxially stretched film or an MD-uniaxially stretched coating layer.

In a further embodiment, in the in-plane direction of the first protective layer 100, the axis of the first protective layer 100 having a low index of refraction may become an oblique direction with respect to the transverse direction thereof, and the axis of the first protective layer 100 having a high index of refraction may become an oblique direction with respect to the machine direction thereof. In this case, the first protective layer 100 may be an MD and TD-biaxially stretched film or an MD and TD-biaxially stretched coating layer.

In an embodiment, in the in-plane direction of the first protective layer 100, the axis of the first protective layer 100 having a low index of refraction becomes the machine direction (MD) thereof, and the axis of the first protective layer 100 having a high index of refraction becomes the transverse direction (TD) thereof, whereby, in consideration of the axial relation with the polarizer 300 described above, the polarizing plate can be manufactured through a roll-to-roll process, thereby improving processability and economic feasibility. Accordingly, the following description will focus on the above case.

In an embodiment, the first protective layer 100 may include a TD-uniaxially stretched first protective film to have the axis of the first protective layer 100 having a low index of refraction and the axis of the first protective layer 100 having a high index of refraction in the in-plane direction thereof.

In an embodiment, upon TD uniaxial stretching, the first protective film may be manufactured by a method including stretching a resin for the first protective film to an elongation of 2 to 10 times only in the TD after melt extrusion. Within this range of elongation, the first protective film can have the axis having a low index of refraction and the axis having a high index of refraction. In an embodiment, the elongation may be about 3 times to about 8 times.

Stretching may be realized by dry etching and/or wet etching at a temperature of (Tg−20)° C. to (Tg+50)° C. (Tg referring to a glass transition temperature of the resin for the first protective film), and, in an embodiment, about 70° C. to 150° C., and, in an embodiment, about 80° C. to 130° C., and, in an embodiment, about 90° C. to 120° C. Within this range, it is possible to obtain the same stretching effects uniformly.

After stretching, the first protective film may be subjected to heat treatment at a temperature (e.g., a predetermined temperature) to secure the axes and retardation of the first protective film. The first protective film manufactured through TD-uniaxial stretching can stably secure the axes and retardation of the first protective film through heat treatment. Temperature and time for heat treatment may be suitably adjusted depending upon materials of the first protective film.

With the axis having a low index of refraction and the axis having a high index of refraction, the first protective layer 100 can secure retardation in a certain range (e.g., a predetermined range). Retardation of the first protective layer 100 can be changed depending upon the degree of stretching the first protective layer 100, an index of refraction in the axis having a low index of refraction, and an index of refraction in the axis having a high index of refraction.

In an embodiment, the first protective layer 100 may have an in-plane retardation (Re) of about 5,000 nm or more, and, in an embodiment, about 5,000 nm to about 15,000 nm, and, in an embodiment, about 5,500 nm to about 12,000 nm, about 6,000 nm to about 13,000 nm, at a wavelength of 550 nm. Within this range, the polarizing plate can improve front contrast ratio while suppressing rainbow mura.

In an embodiment, the first protective layer 100 may have an out-of-plane retardation (Rth) of about 5,000 nm or more, for example, about 5,000 nm, about 6,000 nm, about 7,000 nm, about 8,000 nm, about 9,000 nm, about 10,000 nm, about 11,000 nm, about 12,000 nm, about 13,000 nm, about 14,000 nm, or about 15,000 nm, and, in an embodiment, about 6,000 nm to about 15,000 nm, and, in an embodiment, about 6,000 nm to about 12,000 nm, at a wavelength of 550 nm. Within this range, the first protective layer 100 can prevent or substantially prevent generation of spots caused by birefringence while improving viewing angle in a liquid crystal display.

In an embodiment, the first protective layer 100 may have a degree of biaxiality (NZ) of about 2.5 or less at a wavelength of 550 nm, and, in an embodiment, about 0.1 to about 2.5, for example, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5, and, in an embodiment, about 1.0 to about 2.2, and, in an embodiment, about 1.2 to about 2.0, and, in an embodiment, about 1.4 to about 1.8. Within this range, the first protective layer can prevent or substantially prevent generation of spots caused by birefringence while maintaining mechanical strength of the film.

In an embodiment, among indices of refraction in the in-plane direction of the first protective layer 100, one of an index of refraction nx in the x-direction and an index of refraction ny in the y-direction may be about 1.65 or more at a wavelength of 550 nm. If both nx and ny are less than about 1.65 or if both nx and ny are about 1.65 or more, the first protective layer cannot prevent generation of spots caused by birefringence due to variation in retardation depending upon an angle of incidence and wavelength of light in use. In an embodiment, nx may be about 1.65 or more, and, in an embodiment, about 1.67 to about 1.75, and ny may be in a range of about 1.45 to about 1.55. In another embodiment, ny may be about 1.65 or more, and, in an embodiment, in a range of about 1.67 to about 1.75, and, in an embodiment, in a range of about 1.69 to about 1.72, and nx may be in a range of about 1.45 to about 1.55. In an embodiment, an absolute value of a difference between nx and ny, that is, |nx−ny|, may be in a range of about 0.1 to about 0.2, and, in an embodiment, in a range of about 0.12 to about 0.18 to achieve further improvement in viewing angle without generation of rainbow spots.

In an embodiment, the first protective layer 100 may include a film formed of an optically transparent resin. For example, the first protective layer may include at least one selected from among cellulose ester resins including triacetylcellulose and the like, cyclic polyolefin resins including norbornane, norbornene, amorphous cyclic polyolefin, and the like, polycarbonate resins, polyester resins including polyethylene terephthalate, polybutylene terephthalate, polyethylene naphthalate, polybutylene naphthalate, and the like, polyether sulfone resins, polysulfone resins, polyamide resins, polyimide resins, non-cyclic polyolefin resins, poly (acrylate) resins including poly(methyl methacrylate) and the like, polyvinyl alcohol resins, polyvinyl chloride resins, and polyvinylidene chloride resins.

In an embodiment, the first protective layer 100 may include a polyester resin film including any of polyethylene terephthalate, polybutylene terephthalate, polyethylene naphthalate, polybutylene naphthalate, and the like. The polyester resin film has a low degree of moisture permeation, thereby further improving reliability of the polarizing plate.

The first protective layer 100 may be a single layer or a laminate of multiple resin films integrated with each other through co-extrusion.

In another embodiment, the first protective layer 100 may be a protective coating layer. The protective coating layer may be formed of a typical composition known to those skilled in the art.

In an embodiment, the first protective layer 100 may have a thickness of about 100 µm or less, for example, greater than about 0 µm to about 100 µm, about 10 µm to about 100 µm, and, in an embodiment, about 20 µm to about 100 µm, about 30 µm to about 100 µm, or about 40 µm to about 80 µm. Within this thickness range, the first protective layer 100 can be used in the polarizing plate.

Although not shown in FIG. 1, a functional coating layer, such as any of a hard coating layer, an anti-fingerprint layer, and an anti-reflection layer, may be further formed on an upper surface of the first protective layer 100.

Although not shown in FIG. 1, in an embodiment, the polarizer 300 may be stacked on the first protective layer 100 via an adhesive layer and/or a bonding layer.

Second Protective Layer

The second protective layer 200 may be formed on a lower surface (light incidence surface) of the polarizer 300 to protect the polarizer 300. The second protective layer 200 may assist in remarkable improvement in front contrast ratio, lateral color shift, and black visibility through control of light emitted from an IPS mode liquid crystal panel and transmitted through the polarizer 300.

In an embodiment, the second protective layer 200 may be directly formed on the polarizer 300.

The second protective layer 200 satisfies at least one of Relation 1 and Relation 2.

In an embodiment, the second protective layer 200 satisfies Relation 2, thereby facilitating manufacture of the second protective layer 200 while further improving the effects of the present invention.

In an embodiment, the second protective layer 200 satisfies both Relation 1 and Relation 2, thereby facilitating manufacture of the second protective layer 200 while further improving the effects of the present invention.

In an embodiment, the second protective layer 200 may have Re(450)/Re(550) of about 0.1 to about 10, and, in an embodiment, about 0.5 to about 5, and Re(650)/Re(550) of about 0.1 to about 8, and, in an embodiment, about 0.3 to about 3. Within this range, Relation 1 can be easily realized. In an embodiment, the second protective layer 200 may have Re(450)/Re(550) of about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10, and Re(650)/Re(550) of about 0.1, about 0.5, about 1, about 1.5, about 2, about 2.5, about 3, about 3.5, about 4, about 4.5, about 5, about 5.5, about 6, about 6.5, about 7, about 7.5, or about 8.

In an embodiment, the second protective layer 200 may have Re(450) of about 0 nm to about 20 nm, and, in an embodiment, about 0 nm to 15 nm, Re(550) of about 0 nm to about 15 nm, and, in an embodiment, about 0 nm to about 10 nm, and Re(650) of about 0 nm to about 10 nm, and, in an embodiment, about 0 nm to about 5 nm. Within this range, Relation 1 can be easily realized.

In an embodiment, the second protective layer 200 may have |Rth(450)|/|Rth(550)| of about 0.1 to about 10, and, in an embodiment, about 0.5 to about 5, and |Rth(650)|/|Rth(550)| of about 0.1 to about 8, and, in an embodiment, about 0.1 to about 5, in Relation 2. Within this range, Relation 2 can be easily realized.

In an embodiment, the second protective layer 200 may have an |Rth(450)|/|Rth(550)| of about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10, and an |Rth(650)|/|Rth(550)| of about 0.1, about 0.5, about 1, about 1.5, about 2, about 2.5, about 3, about 3.5, about 4, about 4.5, about 5, about 5.5, about 6, about 6.5, about 7, about 7.5, or about 8.

In an embodiment, the second protective layer 200 may have Rth(450) of about −180 nm to about −10 nm, and, in an embodiment, about −130 nm to about −10 nm, Rth(550) of about −150 nm to about −10 nm, and, in an embodiment, about −100 nm to about −10 nm, and Rth(650) of about −120 nm to about −10 nm, and, in an embodiment, about −90 nm to about −10 nm. Within this range, Relation 2 can be easily realized.

In an embodiment, the second protective layer 200 may have Rth(450) of about −180 nm, about −170 nm, about −160 nm, about −150 nm, about −140 nm, about −130 nm, about −120 nm, about −110 nm, about −100 nm, about −90 nm, about −80 nm, about −70 nm, about −60 nm, about −50 nm, about −40 nm, about −30 nm, about −20 nm, or about −10 nm. In an embodiment, the second protective layer 200 may have Rth(550) of about −150 nm, about −140 nm, about −130 nm, about −120 nm, about −110 nm, about −100 nm, about −90 nm, about −80 nm, about −70 nm, about −60 nm, about −50 nm, about −40 nm, about −30 nm, about −20 nm, or about −10 nm. In an embodiment, the second protective layer 200 may have Rth(650) of about −120 nm, about −110 nm, about −100 nm, about −90 nm, about −80 nm, about −70 nm, about −60 nm, about −50 nm, about −40 nm, about −30 nm, about −20 nm, or about −10 nm.

In an embodiment, the second protective layer 200 may have a thickness of about 15 µm or less, and, in an embodiment, greater than about 0 µm to about 10 µm. Within this thickness range, the second protective layer 200 can be used in the polarizing plate.

The second protective layer 200 may be formed of any material so long as the material can realize the positive C plate layer and satisfy at least one of Relations 1 and 2.

Particularly, the inventors of the present invention adopted a compound including at least one selected from among a cellulose ester compound or a polymer thereof and an aromatic compound or a polymer thereof, as a material for the second protective layer, for formation of a non-liquid crystal layer.

A composition including the cellulose ester compound is used to form the second protective layer 200 as a non-stretched layer. Further, the composition including the cellulose ester compound can easily satisfy at least one of Relations 1 and 2 and allows easy formation of the positive C plate while easily achieving the effects of the present invention together with the first protective layer 100.

In an embodiment, the second protective layer 200 may be formed of a composition for the second protective layer 200, which includes the cellulose ester compound.

In another embodiment, the second protective layer 200 may be formed of a composition for the second protective layer 200, which includes the cellulose ester compound and an aromatic fused ring-containing compound.

The cellulose ester compound may include at least one selected from among a cellulose ester resin, a cellulose ester oligomer, and a cellulose ester monomer.

The cellulose ester compound refers to a condensation product obtained through reaction between a hydroxyl group on a cellulose ester and a carboxylic acid group of carboxylic acid. The cellulose ester compound may be regioselectively or randomly substituted. Regioselectivity may be measured by determining a relative degree of substitution at the positions of $C_6$, $C_3$ and $C_2$ on the cellulose ester by carbon 13 NMR. The cellulose ester compound may be prepared by a typical method through contact between a cellulose solution and at least one $C_1$ to $C_{20}$ acylation agent for a sufficient contact time to provide a cellulose ester having a desired degree of substitution and a desired degree of polymerization. In an embodiment, the acylation agent includes at least one linear or branched $C_1$ to $C_{20}$ alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chlorides. Examples of the acetoacetic ester may include methyl acetoacetate, ethyl acetoacetate, propyl acetoacetate, butyl acetoacetate, and tertiary butyl acetoacetate. In an embodiment, the acylation agent may include linear or branched $C_2$ to $C_9$ alkyl carboxylic acid anhydrides, such as acetic anhydride, propionic anhydride, butyric anhydride, 2-ethylhexanoic anhydride, nonanoic anhydride, and stearic anhydride.

In an embodiment, the cellulose ester compound includes, for example, any of cellulose acetate (CA), cellulose acetate propionate (CAP), and cellulose acetate butyrate (CAB), without being limited thereto.

In an embodiment, the cellulose ester compound may include at least two acyl group substituents. At least one of the acyl groups may include an aromatic substituent and, in the cellulose ester compound, a relative degree of substitution (RDS) may be set in the order of C6>C2>C3. C6 means a degree of substitution at the position of the number 6 carbon in the cellulose ester, C2 means a degree of substitution at the number 2 carbon in the cellulose ester, and C3 means a degree of substitution at the number 3 carbon in the cellulose ester. The aromatic compound may include benzoate or substituted benzoate.

In another embodiment, the cellulose ester compound may include a regioselectively substituted cellulose ester compound having (a) a plurality of chromophore-acyl substituents and (b) a plurality of pivaloyl substituents.

In an embodiment, the cellulose ester compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester compound and the degree of chromophore-acyl substitution at the number 3 carbon in the cellulose ester compound and the degree of chromophore-acyl substitution at the number 6 carbon in the cellulose ester compound may be in a range from about 0.1 to about 1.6; and the chromophore-acyl may be selected from among (i), (ii), (iii), and (iv): (i) ($C_6$ to $C_{20}$)aryl-acyl, where aryl is unsubstituted or substituted with 1 to 5 $R^1$s; (ii) hetero-aryl, where hetero-aryl is a five to ten-membered ring having 1 to 4 hetero atoms selected from among N, O and S, and is unsubstituted or substituted with 1 to 5 $R^1$s;

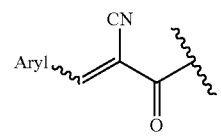

(iii)

where aryl is a $C_1$ to $C_6$ aryl and is unsubstituted or substituted with 1 to 5 $R^1$s; and

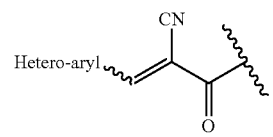

(iv)

where heteroaryl is a five to ten-membered ring having 1 to 4 hetero atoms selected from among N, O and S, and is unsubstituted or substituted with 1 to 5 $R^1$s, $R^1$s being each independently nitro, cyano, ($C_1$ to $C_6$)alkyl, halo($C_1$ to $C_6$)alkyl, ($C_6$ to $C_{20}$)aryl-$CO_2$—, ($C_6$ to $C_{20}$)aryl, ($C_1$ to $C_6$)alkoxy, halo($C_1$ to $C_6$)alkoxy, halo, five to ten-membered heteroaryl having 1 to 4 hetero atoms selected from among N, O and S, or

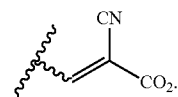

In an embodiment, the chromophore-acyl may be unsubstituted or substituted benzoyl or unsubstituted or substituted naphthyl.

In an embodiment, the chromophore-acyl may be selected from the group consisting of:

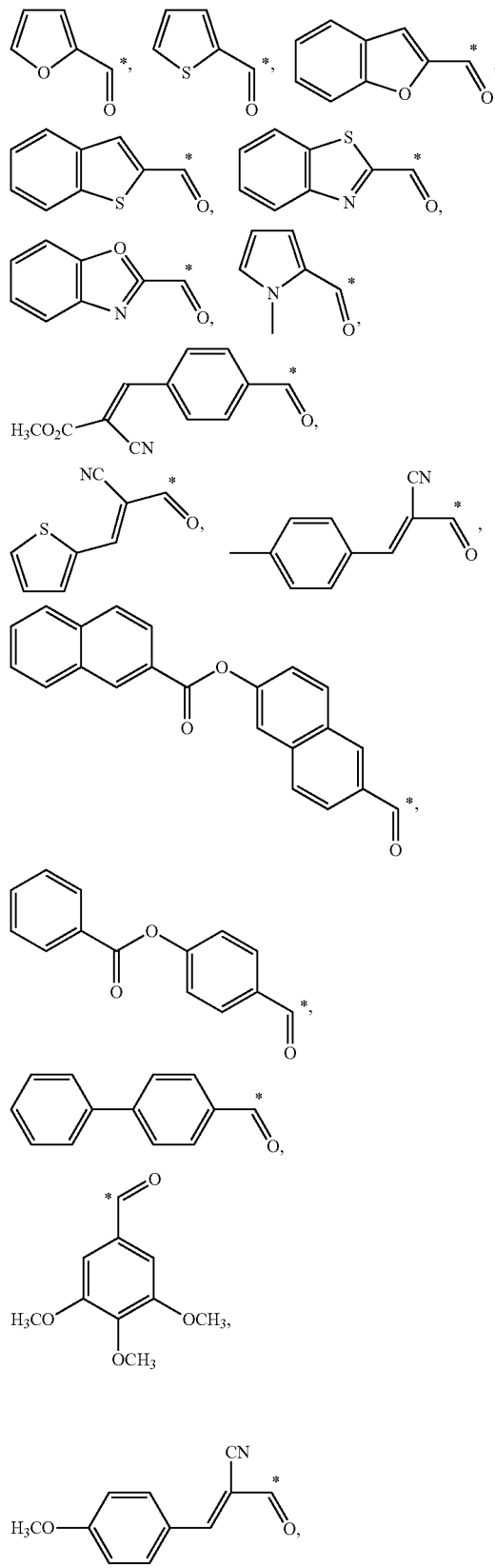

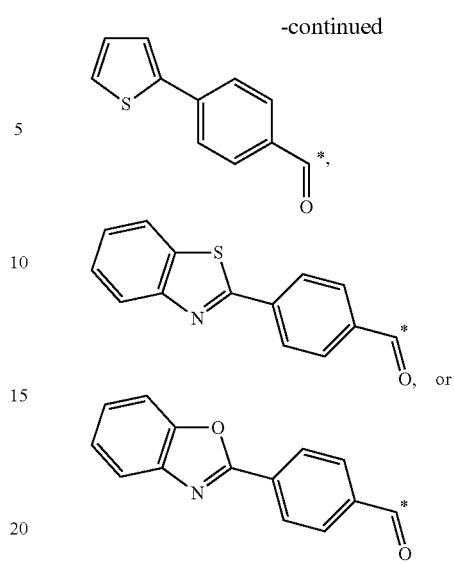

where * indicates a linking site of the chromophore-acyl substituent to oxygen of the cellulose ester.

In another embodiment, the cellulose ester compound may include an ester polymer having an acyl unit, in which at least some hydroxyl groups [a $C_2$ hydroxyl group, a $C_3$ hydroxyl group or a $C_6$ hydroxyl group] of a sugar monomer constituting cellulose are unsubstituted or substituted, as represented by Formula 1:

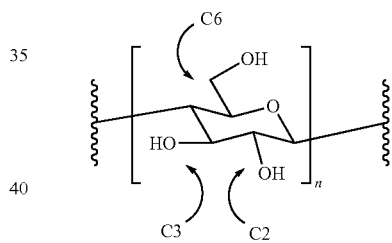

where n is an integer of 1 or more.

A substituent group for the cellulose ester polymer or the acyl unit may include at least one selected from among a halogen atom, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, the term "acyl" may mean R—C(=O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen based compounds for convenience. The composition for the second retardation layer may include the cellulose ester polymer alone or a mixture including the cellulose ester polymer.

Here, "halogen" means fluorine (F), Cl, Br, or I, and, in an embodiment, F.

The "halogen-containing functional group" is an organic functional group containing at least one halogen atom and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—* (* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

In an embodiment, the composition for the positive C plate retardation layer may include a cellulose ester polymer substituted with an acyl group, a halogen, or a halogen-containing functional group. In an embodiment, the halogen may be fluorine. In an embodiment, the halogen may be present in an amount of 1 wt % to 10 wt % in the cellulose ester polymer. Within this range, the composition allows easy formation of the positive C plate retardation layer having properties of the present invention and can improve ellipticity.

For formation of the positive C plate retardation layer, the cellulose ester polymer may be prepared by a typical method known to those skilled in the art or may be obtained from commercially available products. For example, the cellulose ester polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

The aromatic compound includes a phenyl group and may include an unsubstituted or halogen, and, in an embodiment, fluorine (F)-containing polystyrene compound, or a fluorobenzene or difluorobenzene structure, without being limited thereto.

The aromatic fused-ring containing compound serves to adjust out-of-plane retardation and wavelength dispersion of the second protective layer 200. The aromatic fused-ring containing compound includes a phenyl group and may include a fluorobenzene or difluorobenzene structure, naphthalene, anthracene, phenanthrene, pyrene, a compound represented by Structure 1, or a compound represented by Structure 2. The aromatic fused-ring containing additive may include any of 2-naphthyl benzoate, 2,6-naphthalene dicarboxylic acid diester represented by Structure 3, naphthalene, and an abietic acid ester represented by Structure 4, without being limited thereto:

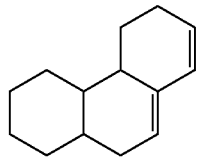

Structure 1

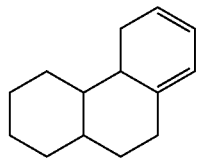

Structure 2

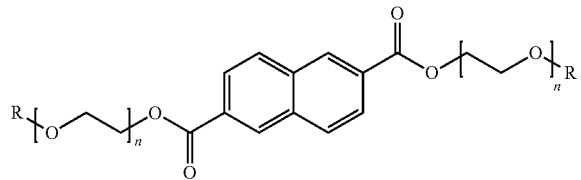

Structure 3 where R is a $C_1$ to $C_{20}$ alkyl group or a $C_6$ to $C_{20}$ aryl group and n is an integer of 0 to 6.

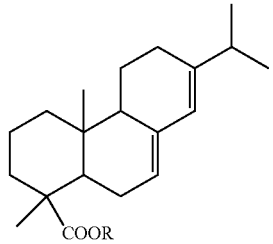

Structure 4 where R is a $C_1$ to $C_{20}$ alkyl group or a $C_6$ to $C_{20}$ aryl group.

In an embodiment, the aromatic fused-ring containing compound is at least one selected from among naphthalene, anthracene, phenanthrene, pyrene, 2-naphthyl benzoate, and 2,6-naphthalene dicarboxylic acid diester represented by Structure 3.

In an embodiment, the aromatic fused-ring containing compound may be present in an amount of 30 wt % or less, and, in an embodiment, 0.1 wt % to 30 wt %, and, in an embodiment, 5 wt % to 20 wt %, in the second retardation layer. Within this range, the aromatic fused-ring containing compound can improve thermal stability of the composition and retardation of the polarizing plate per thickness, and can adjust wavelength dispersion.

The composition for the second protective layer 200 may further include additives selected from among an antistatic agent, a plasticizer, a stabilizer, a UV absorbent, an anti-blocking agent, a slipping agent, a lubricant, a dye, a pigment, and a retardation enhancer, without being limited thereto.

In an embodiment, the composition for the second protective layer 200 is prepared using a solution containing a first solvent or a second solvent, in which the first solvent serves to control dissolution of a base layer such that the coating layer can be formed by coating the composition to a thickness (e.g., a predetermined thickness). For example, the solvent may include at least one selected from among propylene glycol methyl ether, methyl isopropyl ketone, toluene, and xylene, without being limited thereto. The second solvent may include at least one selected from among a solvent capable of dissolving the base layer and a solvent not dissolving the base layer. For example, the second solvent may include one type of first solvent or at least one selected from among methyl ethyl ketone, methanol, ethyl acetate, dichloromethane, cyclopentanone, and tetrahydrofuran, without being limited thereto.

In an embodiment, the second protective layer 200 may be formed by directly coating the composition for the second protective layer 200 on one surface of the polarizer 300 or a third protective layer described below, followed by drying and/or curing.

Coating may be performed by a typical method known to those skilled in the art, for example, Meyer bar coating, die coating, gravure coating, and the like.

In an embodiment, the composition may include about 1 wt % to 20 wt % of at least one selected from among a cellulose ester compound and an aromatic compound or a polymer thereof in terms of solid content. Within this range, the composition can realize the positive C plate retardation layer and allows adjustment of wavelength dispersion.

The composition is coated to a thickness (e.g., a predetermined thickness) to form a coating layer, which in turn is dried and/or cured at a temperature of about 40° C. to 200° C., thereby forming the positive C plate retardation layer. Within this range, it is possible to improve retardation per thickness together with thermal stability. In an embodiment, the coating layer is dried and cured at about 60° C. to 120° C. for about 0.5 min to 30 min, and, in an embodiment, about 1 min to 10 min.

In an embodiment, although not shown in FIG. 1, an adhesive layer or a bonding layer may be further formed on a lower surface of the second protective layer 200. The polarizing plate may be secured to an adherend, for example, an IPS liquid crystal panel, via the adhesive layer or the bonding layer.

In an embodiment, the polarizing plate may further include a third protective layer.

Next, a polarizing plate according to a further embodiment of the present invention will be described with reference to FIG. 3.

Figure 3:
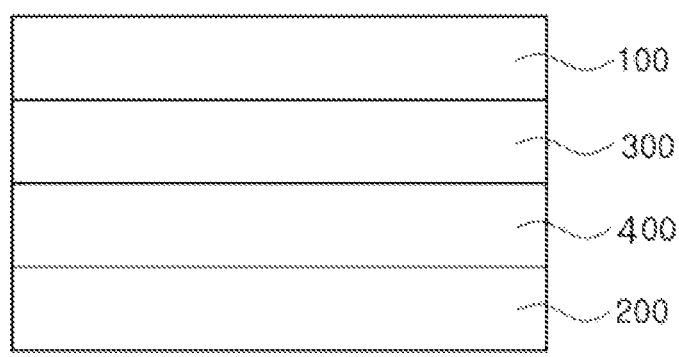
FIG. 3 is a cross-sectional view of a polarizing plate for IPS mode, according to another embodiment of the present invention.

Referring to FIG. 3, a polarizing plate includes a polarizer 300, a first protective layer 100, a second protective layer 200, and a third protective layer 400. The polarizing plate according to this embodiment is substantially the same as the polarizing plate shown in FIG. 1 except that the third protective layer 400 is further formed between the polarizer 300 and the second protective layer 200.

The third protective layer 400 may act as a support layer upon formation of the second protective layer 200.

In an embodiment, the third protective layer 400 may have an in-plane retardation Re(550) of about 100 nm or less, and, in an embodiment, about 0 nm, about 1 nm, about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm, and, in an embodiment, about 0 nm to about 10 nm, or about 40 nm to about 100 nm. Within this range, the third protective layer 400 may not affect the functions of the second protective layer.

In an embodiment, the third protective layer 400 may have an out-of-plane retardation Rth(550) of about −10 nm to about 200 nm at a wavelength of 550 nm. Within this range, the third protective layer 400 may not affect incident or exiting light. In an embodiment, the third protective layer 400 may have an out-of-plane retardation Rth(550) of about −10 nm, about −5 nm, about 0 nm, about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 110 nm, about 115 nm, about 120 nm, about 125 nm, about 130 nm, about 140 nm, about 145 nm, about 150 nm, about 155 nm, about 160 nm, about 165 nm, about 170 nm, about 175 nm, about 180 nm, about 185 nm, about 190 nm, about 195 nm, or about 200 nm. In an embodiment, the third protective layer may have an out-of-plane retardation of about −10 nm to 10 nm or about 50 nm to 200 nm, at a wavelength of 550 nm.

In an embodiment, the third protective layer 400 may have a degree of biaxiality of about −1 to 10 at a wavelength of 550 nm, and, in an embodiment, about −1, about 0, about 1, about 2, about 3, about 4, about 5, about 6, about 7, about 8, about 9, or about 10. In an embodiment, the third protective layer 400 may have a degree of biaxiality of about 0 to 1 or about 1 to 5 at a wavelength of 550 nm.

In an embodiment, the third protective layer 400 may be a non-stretched film. With this structure, the third protective layer 400 may not affect light entering the retardation film or light emitted from the positive C plate retardation layer.

In an embodiment, a laminate of the third protective layer 400 and the second protective layer 200 may satisfy at least one of the following Relation 3 and Relation 4. As a result, the polarizing plate can improve front contrast ratio and lateral color shift.

$$Re(450)/Re(550) > Re(650)/Re(550), \quad \text{Relation 3}$$

where Re(450), Re(550), and Re(650) are in-plane retardations (unit: nm) of the laminate of the third protective layer and the second protective layer at wavelengths of about 450 nm, about 550 nm, and about 650 nm, respectively, and $$|Rth(450)|/|Rth(550)| > |Rth(650)|/|Rth(550)|, \quad \text{Relation 4}$$

where |Rth(450)|, |Rth(550)|, and |Rth(650)| are absolute values of out-of-plane retardations (unit: nm) of the laminate of the third protective layer and the second protective layer at wavelengths of about 450 nm, about 550 nm, and about 650 nm, respectively.

In an embodiment, the laminate of the third protective layer 400 and the second protective layer 200 may have an Re(450)/Re(550) of about 0.1 to 10, and, in an embodiment, about 0.5 to 5, and an Re(650)/Re(550) of about 0.1 to 8, and, in an embodiment, about 0.3 to 3, in Relation 3. Within this range, Relation 3 can be easily realized. In an embodiment, the laminate of the third protective layer 400 and the second protective layer 200 may have an Re(450)/Re(550) of about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10, and an Re(650)/Re(550) of about 0.1, about 0.5, about 1, about 1.5, about 2, about 2.5, about 3, about 3.5, about 4, about 4.5, about 5, about 5.5, about 6, about 6.5, about 7, about 7.5, or about 8.

In an embodiment, the laminate of the third protective layer 400 and the second protective layer 200 may have an Re(450) of about 0 nm to 20 nm, and, in an embodiment, about 0 nm to 15 nm, an Re(550) of about 0 nm to 15 nm, and, in an embodiment, about 0 nm to 10 nm, and an Re(650) of about 0 nm to 10 nm, and, in an embodiment, about 0 nm to 5 nm. Within this range, Relation 3 can be easily realized.

In an embodiment, the laminate of the third protective layer 400 and the second protective layer 200 may have an |Rth(450)|/|Rth(550)| of about 0.1 to 10, and, in an embodiment, about 0.5 to 5, and an |Rth(650)|/|Rth(550)| of about 0.1 to 8, and, in an embodiment, about 0.1 to 5, in Relation 4. Within this range, Relation 4 can be easily realized.

In an embodiment, the laminate of the third protective layer 400 and the second protective layer 200 may have an |Rth(450)|/|Rth(550)| of about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10, and an |Rth(650)|/|Rth(550)| of about 0.1, about 0.5, about 1, about 1.5, about 2, about 2.5, about 3, about 3.5, about 4, about 4.5, about 5, about 5.5, about 6, about 6.5, about 7, about 7.5, or about 8.

In an embodiment, the laminate of the third protective layer 400 and the second protective layer 200 may have an Rth(450) of about −180 nm to −10 nm, and, in an embodiment, about −130 nm to −10 nm, an Rth(550) of about −150 nm to −10 nm, and, in an embodiment, about −100 nm to −10 nm, and an Rth(650) of about −120 nm to −10 nm, and, in an embodiment, about −90 nm to −10 nm. Within this range, Relation 4 can be easily realized.

In an embodiment, the laminate of the third protective layer 400 and the second protective layer 200 may have an Rth(450) of about −180 nm, about −170 nm, about −160 nm, about −150 nm, about −140 nm, about −130 nm, about −120 nm, about −110 nm, about −100 nm, about −90 nm, about −80 nm, about −70 nm, about −60 nm, about −50 nm, about −40 nm, about −30 nm, about −20 nm, or about −10 nm. In an embodiment, the second protective layer 200 may have an Rth(550) of about −150 nm, about −140 nm, about −130 nm, about −120 nm, about −110 nm, about −100 nm, about −90 nm, about −80 nm, about −70 nm, about −60 nm, about −50 nm, about −40 nm, about −30 nm, about −20 nm, or about −10 nm. In an embodiment, the second protective layer 200 may have an Rth(650) of about −120 nm, about −110 nm, about −100 nm, about −90 nm, about −80 nm, about −70 nm, about −60 nm, about −50 nm, about −40 nm, about −30 nm, about −20 nm, or about −10 nm.

The third protective layer 400 may include a film formed of an optically transparent resin. In an embodiment, the third protective layer 400 may include at least one selected from among cellulose ester resins including triacetylcellulose and the like, cyclic polyolefin resins including norbornane, norbornene, amorphous cyclic polyolefin, and the like, polycarbonate resins, polyester resins including polyethylene terephthalate, polybutylene terephthalate, polyethylene naphthalate, polybutylene naphthalate, and the like, polyether sulfone resins, polysulfone resins, polyamide resins, polyimide resins, non-cyclic polyolefin resins, poly(acrylate) resins including poly(methyl methacrylate) and the like, polyvinyl alcohol resins, polyvinyl chloride resins, and polyvinylidene chloride resins.

In an embodiment, the third protective layer 400 may have a thickness of about 100 μm or less, and, in an embodiment, greater than about 0 μm to about 100 μm, for example, about 10 μm to about 100 μm, and, in an embodiment, about 10 μm to about 55 μm. Within this thickness range, the third protective layer 400 can be used in the polarizing plate.

FIG. 3 shows the polarizing plate in which the third protective layer 400 is interposed between the polarizer 300 and the second protective layer 200. In another embodiment, the third protective layer 400 may be stacked on a lower surface of the second protective layer 200 such that the first protective layer 100, the polarizer 300, the second protective layer 200, and the third protective layer 400 are sequentially stacked in the stated order.

An optical display apparatus according to the present invention includes the polarizing plate for IPS mode according to an embodiment of the present invention. In an embodiment, the optical display apparatus may include an IPS mode liquid crystal display.

The liquid crystal display includes a liquid crystal panel, the polarizing plate according to an embodiment of the present invention (viewer-side polarizing plate) stacked on a light exit surface of the liquid crystal panel, and a polarizing plate (light source-side polarizing plate) stacked on a light incidence surface of the liquid crystal panel. The polarizing plate stacked on the light incidence surface may include a typical polarizing plate well known to those skilled in the art.

The liquid crystal display includes a light source on a lower surface of the light source-side polarizing plate. The light source may include a light source having continuous luminous spectrum. For example, the light source may include any of a white LED (white LED) light source, a quantum dot (QD) light source, a metal fluoride red phosphor light source, such as a KSF ($K_2SiF_6$:$Mn^{4+}$) phosphor or KTF ($K_2TiF_6$:$Mn^{4+}$) phosphor-containing light source, and the like. The liquid crystal panel may be a vertical alignment (VA) mode panel, without being limited thereto.

Next, the present invention will be described in further detail with reference to some examples. However, it should be noted that these examples are provided for illustration only and should not be construed in any way as limiting the invention.

EXAMPLE 1

A 17 μm thick polarizer was fabricated by stretching polyvinyl alcohol film (VF-TS #4500, thickness: 45 μm, Kurary Co., Ltd.) to 2 times an initial length thereof at 30° C. in the MD of the polyvinyl alcohol film and dyeing the polyvinyl alcohol film with iodine, followed by stretching in an aqueous solution of boric acid at 60° C. The maximum elongation was set to 6.5 times. In an in-plane direction of the polarizer, an axis having a high index of refraction was an absorption axis (MD) of the polarizer.

A composition for a second protective layer (composition for a positive C plate layer, EASTMAN Co., Ltd.) was coated in the content of 10% to a predetermined thickness on a lower surface of a triacetylcellulose (TAC) film (KC4CT1W, thickness: 40 μm, Re(550): 0.10 nm, Rth(550): 0.30 nm, NZ(550): 0.8, Kurary Co., Ltd.), followed by drying at 80° C. for 10 min, thereby forming a second protective layer on the lower surface of the TAC film. The second protective layer had a thickness of 5 μm and was a positive C plate layer. The second protective layer had wavelength dispersion as listed in Table 1.

An upper surface of the TAC film was bonded to a lower surface of the polarizer (light incidence surface). A polyethylene terephthalate (PET) film (thickness: 80 μm, Re(550): 8,500 nm, Rth(550): 9,300 nm, NZ(550): 1.55, TD-uniaxially stretched film, Toyobo Co., Ltd.) was bonded to an upper surface of the polarizer (light exit surface). In an in-plane direction of the PET film, an axis having a low index of refraction is the MD of the PET film. Assuming an axis of the polarizer having a high index of refraction in an in-plane direction of the polarizer is 0°, an angle of an axis having a low index of refraction in the in-plane direction of the PET film is 0°.

EXAMPLE 2

A polarizing plate was fabricated in the same manner as in Example 1 except that a norbornene retardation film (ZB12-052125-F1490, thickness: 51 μm, Re(550): 52 nm, Rth(550): 125 nm, NZ(550): 2.9, ZEON Co., Ltd.) was used instead of a TAC film and wavelength dispersion was changed.

EXAMPLE 3

A polarizing plate was fabricated in the same manner as in Example 1 except that the composition for the second protective layer was directly coated onto the lower surface of the polarizer without using a TAC film and wavelength dispersion was changed.

EXAMPLES 4 And 5

Each of polarizing plates was fabricated in the same manner as in Example 1 except that components of the polarizing plate were changed as listed in Table 1.

COMPARATIVE EXAMPLES 1 To 4

Each of polarizing plates was fabricated in the same manner as in Example 1 except that the components of the polarizing plate were changed as listed in Table 1.

Details of the polarizing plates manufactured in the Examples and Comparative Examples are shown in Table 1.

(1) Front contrast ratio and relative contrast ratio (%): A module for a liquid crystal display (the same configuration as Samsung TV (55 inches, 2016 Model: UN55KS8000F) except for use of the polarizing plate manufactured in each of the Examples and Comparative Examples as a viewer-side polarizing plate) including an edge type LED light source was fabricated by assembling an LED light source, a light guide plate, and a panel for IPS mode liquid crystal displays using the polarizing plate manufactured in each of the Examples and Comparative Examples. The liquid crystal display module was measured as to brightness at the front side (0°, 0°) in the spherical coordinate system in each of a white mode and a black mode using a brightness instrument EZCONTRAST X88RC (EZXL-176R-F422A4, ELDIM).

The front contrast ratio was calculated by the ratio of brightness in the white mode to brightness in the black mode. Relative contrast ratio was calculated according to an equation: [(front contrast ratio of corresponding example or comparative example−front contrast ratio of Example 1)/(front contrast ratio of Example 1)]×100.

(2) Lateral color shift (Δx,y): A module was assembled by the same method as in (1). Color coordinates x and y were measured at (60°, 45° and (60°, 135° as (θ, φ) using a brightness instrument EZCONTRAST X88RC (EZXL-176R-F422A4, ELDIM). The color coordinates x and y were evaluated according to the CIE 1931 standard.

Lateral Δx,y was calculated based on the distance of the color coordinates x and y between (60°, 45°) and (60°, 135°.

Relative lateral Δx,y was calculated according to an equation: [(lateral Δx,y of corresponding example or com-

TABLE 1

| | Angle | Re of first protective layer | Rth of second protective layer | Second protective layer | Re(450)/ Re(550) | Re(650)/ Re(550) | \|Rth(450)\| / \|Rth(550)\| | \|Rth(650)\|/ \|Rth(550)\| |
|---|---|---|---|---|---|---|---|---|
| Example 1 | 0 | 8,500 | −30 | +C | 1.6 | 1.0 | 1.1 | 0.9 |
| Example 2 | 0 | 8,500 | −30 | +C | 2.5 | 1.1 | 1.3 | 0.8 |
| Example 3 | 0 | 8,500 | −30 | +C | 3.4 | 1.2 | 1.6 | 1.1 |
| Example 4 | +4 | 8,500 | −30 | +C | 4.8 | 0.6 | 3.5 | 0.7 |
| Example 5 | 0 | 6,500 | −70 | +C | 4.7 | 4.1 | 1.6 | 0.1 |
| Comparative Example 1 | −6 | 8,500 | −30 | +C | 1.9 | 1.1 | 1.5 | 1.1 |
| Comparative Example 2 | +6 | 8,500 | −30 | +C | 1.2 | 0.3 | 1.4 | 0.9 |
| Comparative Example 3 | 0 | 4,500 | −30 | +C | 3.6 | 1.2 | 1.5 | 1.4 |
| Comparative Example 4 | 0 | 8,500 | −30 | +C | 2.3 | 4.4 | 0.1 | 1.6 |

In Table 1, "angle" refers to an angle (unit: °) of an axis of the first protective layer having a low index of refraction in an in-plane direction of the first protective layer, assuming an axis of the polarizer having a high index of refraction in an in-plane direction of the polarizer is 0°.

The polarizing plates prepared in the Examples and Comparative Examples were evaluated as to properties listed in Table 2.

parative example−lateral Δx,y of Example 1)/(lateral Δx,y of Example 1)]×100. A lower absolute value of the relative lateral Δx,y value indicates better improvement in lateral color shift.

(3) Re (unit: nm) of polarizing plate (at 550 nm): Re(550) of a polarizing plate was measured through Axometrics multilayer analysis after measurement of retardation of the polarizing plate using an Axoscan (AxoMetrics Co., Ltd.).

TABLE 2

| | Brightness in white mode | Brightness in black mode | Front contrast ratio | Relative Contrast ratio | Lateral Δx,y | Relative lateral Δx,y | Re of polarizing plate |
|---|---|---|---|---|---|---|---|
| Example 1 | 278 | 0.196 | 1418 | 0% | 0.059 | 0% | 0.2 |
| Example 2 | 278 | 0.195 | 1426 | 1% | 0.051 | −14% | 2.2 |
| Example 3 | 277 | 0.195 | 1421 | 0% | 0.060 | 2% | 0.9 |
| Example 4 | 270 | 0.199 | 1357 | 4% | 0.062 | 5% | 0.8 |
| Example 5 | 280 | 0.191 | 1466 | 3% | 0.043 | −27% | 4.5 |
| Comparative Example 1 | 239 | 0.220 | 1086 | −23% | 0.074 | 25% | 0.6 |
| Comparative Example 2 | 242 | 0.209 | 1158 | −18% | 0.072 | 22% | 0.6 |
| Comparative Example 3 | 261 | 0.207 | 1261 | −11% | 0.088 | 49% | 3.8 |
| Comparative Example 4 | 253 | 0.208 | 1216 | −14% | 0.095 | 61% | 2.7 |

As shown in Table 2, the polarizing plate according to the present invention improves front contrast ratio by improving brightness in a white mode while reducing brightness in a black mode and improves image quality by reducing lateral color shift.

On the contrary, the polarizing plates of Comparative Examples 1 and 2 failed to satisfy the conditions for the present invention related to the angle between the axes and thus had low brightness in the white mode and high brightness in the black mode, thereby causing a problem of light leakage from the panel and deterioration in front contrast ratio. The polarizing plate of Comparative Example 3 failed to satisfy super high retardation, that is, an in-plane retardation of 5,000 nm or more for the first protective layer, thereby causing rainbow mura of the panel and increase in difference between lateral colors. The polarizing plate of Comparative Example 4 failed to satisfy any one of Relations 1 and 2, thereby causing increase in difference between lateral colors on the panel.

Although some embodiments of the present invention have been described herein, it should be understood that various modifications, changes, alterations, and equivalent embodiments can be made by those skilled in the art without departing from the spirit and scope of the present invention.

What is claimed is:

1. A polarizing plate, comprising:
a polarizer;
a first protective layer on an upper surface of the polarizer; and
a second protective layer on a lower surface of the polarizer,
wherein, an axis of the polarizer having a high index of refraction in an in-plane direction of the polarizer is a reference axis (0°), an angle of an axis of the first protective layer having a low index of refraction in an in-plane direction of the first protective layer is in a range of about −5° to +5°, the first protective layer has an in-plane retardation of about 5,000 nm or more at a wavelength of 550 nm, the second protective layer comprises a positive C plate layer, and the second protective layer satisfies at least one of the following Relations 1 and 2:

$$Re(450)/Re(550) > Re(650)/Re(550), \quad \text{Relation 1}$$

where $Re(450)$, $Re(550)$, and $Re(650)$ are in-plane retardations (unit: nm) of the second protective layer at wavelengths of about 450 nm, about 550 nm, and about 650 nm, respectively, and $$|Rth(450)|/|Rth(550)| > |Rth(650)|/|Rth(550)|, \quad \text{Relation 2}$$

where $|Rth(450)|$, $|Rth(550)|$, and $|Rth(650)|$ are absolute values of out-of-plane retardations (unit: nm) of the second protective layer at wavelengths of about 450 nm, about 550 nm, and about 650 nm, respectively.

2. The polarizing plate according to claim 1, wherein the second protective layer satisfies both Relation 1 and Relation 2.

3. The polarizing plate according to claim 1, wherein, in Relation 1, $Re(450)/Re(550)$ is in a range of about 0.1 to about 10, and $Re(650)/Re(550)$ is in a range of about 0.1 to about 8.

4. The polarizing plate according to claim 1, wherein, in Relation 2, $|Rth(450)|/|Rth(550)|$ is in a range of about 0.1 to about 10, and $|Rth(650)|/|Rth(550)|$ is in a range of about 0.1 to about 8.

5. The polarizing plate according to claim 1, wherein the second protective layer has an out-of-plane retardation of about −150 nm to about −10 nm at a wavelength of 550 nm.

6. The polarizing plate according to claim 1, wherein the second protective layer is a non-liquid crystal layer.

7. The polarizing plate according to claim 6, wherein the second protective layer is a coating layer formed of a composition comprising at least one selected from among a cellulose ester compound or a polymer thereof and an aromatic compound or a polymer thereof.

8. The polarizing plate according to claim 1, wherein the axis of the first protective layer having the low index of refraction in the in-plane direction thereof is a machine direction (MD) of the first protective layer, and an axis of the first protective layer having a high index of refraction in the in-plane direction thereof is a transverse direction (TD) of the first protective layer.

9. The polarizing plate according to claim 1, wherein the axis of the polarizer having the high index of refraction in the in-plane direction thereof is a machine direction of the polarizer, and an axis of the polarizer having a low index of refraction in the in-plane direction thereof is a transverse direction of the polarizer.

10. The polarizing plate according to claim 1, wherein the second protective layer is directly formed on the polarizer.

11. The polarizing plate according to claim 1, further comprising a third protective layer.

12. The polarizing plate according to claim 11, wherein the third protective layer has an in-plane retardation of about 100 nm or less at a wavelength of 550 nm.

13. The polarizing plate according to claim 11, wherein the third protective layer has an out-of-plane retardation of about −10 nm to about 200 nm at a wavelength of 550 nm.

14. The polarizing plate according to claim 11, wherein the third protective layer has a degree of biaxiality of −1 to 10 at a wavelength of 550 nm.

15. The polarizing plate according to claim 11, wherein a laminate of the third protective layer and the second protective layer satisfies at least one of the following Relations 3 and 4:

$$Re(450)/Re(550) > Re(650)/Re(550), \quad \text{Relation 3}$$

where Re(450), Re(550), and Re(650) are in-plane retardations (unit: nm) of the laminate of the third protective layer and the second protective layer at wavelengths of about 450 nm, about 550 nm, and about 650 nm, respectively, and Relation 4

$$|Rth(450)|/|Rth(550)| > |Rth(650)|/|Rth(550)|, \quad \text{Relation 4}$$

where |Rth(450)|, |Rth(550)|, and |Rth(650)| are absolute values of out-of-plane retardations (unit: nm) of the laminate of the third protective layer and the second protective layer at wavelengths of about 450 nm, about 550 nm, and about 650 nm, respectively.

16. The polarizing plate according to claim 15, wherein, in Relation 3, Re(450)/Re(550) is in a range of about 0.1 to about 10, and Re(650)/Re(550) is in a range of about 0.1 to about 8.

17. The polarizing plate according to claim 15, wherein, in Relation 4, |Rth(450)|/|Rth(550)| is in a range of about 0.1 to about 10, and |Rth(650)|/|Rth(550)| is in a range of about 0.1 to about 8.

18. The polarizing plate according to claim 11, wherein a laminate of the third protective layer and the second protective layer has an out-of-plane retardation of about −150 nm to about −10 nm at a wavelength of 550 nm.

19. The polarizing plate according to claim 1, wherein the polarizing plate has an in-plane retardation of about −10 nm to about 10 nm at a wavelength of 550 nm.

20. An optical display apparatus comprising the polarizing plate according to claim 1.

* * * * *